(12) United States Patent
Shigeta et al.

(10) Patent No.: US 9,638,312 B2
(45) Date of Patent: May 2, 2017

(54) DRIVE UNIT AND DRIVE MODULE (71) Applicant: JTEKT CORPORATION, Osaka-shi (JP)

(72) Inventors: Ryohei Shigeta, Anjo (JP); Yoshinao Iwase, Nagoya (JP); Keita Nomura, Kariya (JP); Ryouichi Kubo, Kashihara (JP)

(73) Assignee: JTEKT CORPORATION, Osaka-shi (JP)

( * ) Notice: Subject to any disclaimer, the term of this patent is extended or adjusted under 35 U.S.C. 154(b) by 88 days.

(21) Appl. No.: 14/679,330

(22) Filed: Apr. 6, 2015

(65) Prior Publication Data
US 2015/0291151 A1    Oct. 15, 2015

(30) Foreign Application Priority Data

Apr. 10, 2014 (JP) ................................. 2014-081127
Oct. 10, 2014 (JP) ................................. 2014-208790

(51) Int. Cl.
*B60L 9/00* (2006.01)
*B60L 11/00* (2006.01)
(Continued)

(52) U.S. Cl.
CPC .......... *F16H 57/021* (2013.01); *B60W 20/15* (2016.01); *F16H 1/08* (2013.01); *F16H 1/20* (2013.01);
(Continued)

(58) Field of Classification Search
CPC ........ B60L 15/10; B60L 15/20; Y02T 10/645; Y02T 10/7275; Y02T 10/7258; Y10S 903/902; Y10S 903/909; B60K 2001/001; B60W 20/15; B60W 2520/06; B60W 2710/083; F16H 1/08; F16H 2057/02043; F16H 57/021
(Continued)

(56) References Cited

U.S. PATENT DOCUMENTS 4,250,983 A * 2/1981 Handke ............... F16D 29/00
                                                192/103 R
4,957,460 A * 9/1990 Harada ................ B63H 21/28
                                                440/75
(Continued)

FOREIGN PATENT DOCUMENTS

JP        09-322311 A       12/1997

OTHER PUBLICATIONS

Extended European Search Report issued Sep. 21, 2015 in Patent Application No. 15162949.0.

*Primary Examiner* — Harry Oh
(74) *Attorney, Agent, or Firm* — Oblon, McClelland, Maier & Neustadt, L.L.P.

(57) ABSTRACT

A drive unit includes a speed reducer that includes a plurality of gears having helical teeth and rotatably supported by bearings, and transfers rotation of a drive motor to rear drive wheels of a vehicle. The maximum value of torque to be generated by the drive motor during rearward travel of the vehicle is set to be lower than that during forward travel. Under such a precondition, the size of a bearing that receives a load during rearward travel, among the bearings which constitute the speed reducer, is smaller than the size of a bearing that receives a load during forward travel.

3 Claims, 6 Drawing Sheets (51) Int. Cl.
  *G05D 1/00* (2006.01)
  *G05D 3/00* (2006.01)
  *G06F 7/00* (2006.01)
  *G06F 17/00* (2006.01)
  *F16H 57/021* (2012.01)
  *F16H 1/20* (2006.01)
  *F16H 1/08* (2006.01)
  *B60W 20/15* (2016.01)
  *B60K 1/00* (2006.01)
  *F16H 57/02* (2012.01)

(52) U.S. Cl.
  CPC .... *B60K 2001/001* (2013.01); *B60W 2520/06* (2013.01); *B60W 2710/083* (2013.01); *F16H 2057/02043* (2013.01); *Y02T 10/7258* (2013.01); *Y10S 903/909* (2013.01)

(58) Field of Classification Search
  USPC .......................................................... 701/22
  See application file for complete search history.

(56) References Cited

U.S. PATENT DOCUMENTS

| | | | |
|---|---|---|---|
| 7,575,192 B1 | 8/2009 | Kish | |
| 2001/0050190 A1* | 12/2001 | Takenaka | B60K 6/365 180/65.235 |
| 2004/0105601 A1* | 6/2004 | Honda | F16C 17/047 384/368 |
| 2007/0093344 A1* | 4/2007 | Kira | B60K 6/36 475/150 |
| 2007/0172166 A1* | 7/2007 | Kawaguchi | F16C 19/182 384/512 |
| 2008/0118344 A1* | 5/2008 | Matsumori | F16C 19/386 415/45 |
| 2008/0124014 A1* | 5/2008 | Smook | F16C 35/067 384/428 |
| 2008/0166082 A1* | 7/2008 | Hofmann | F16C 19/38 384/613 |
| 2009/0170649 A1* | 7/2009 | Murakami | F16H 3/728 475/5 |
| 2009/0208160 A1* | 8/2009 | Wolf | F16C 19/49 384/477 |
| 2011/0029177 A1* | 2/2011 | Yeung | B60K 6/442 701/22 |
| 2011/0139522 A1* | 6/2011 | Takenaka | B60K 1/02 180/65.1 |
| 2012/0255798 A1* | 10/2012 | Palmer | B60K 17/04 180/65.6 |
| 2012/0308298 A1* | 12/2012 | Albrecht | F16H 1/16 403/269 |
| 2013/0059694 A1* | 3/2013 | Ooiso | B60K 1/02 475/269 |
| 2014/0349812 A1* | 11/2014 | Hiyoshi | B60K 17/356 477/6 |
| 2015/0005130 A1* | 1/2015 | Yamamoto | B60K 7/00 475/149 |
| 2015/0006006 A1* | 1/2015 | Scheidle | B60L 11/1803 701/22 |
| 2015/0011344 A1* | 1/2015 | Ebihara | F16H 9/18 474/8 |
| 2015/0014071 A1* | 1/2015 | Severinsson | B60K 1/00 180/65.7 |
| 2015/0291058 A1* | 10/2015 | Shigeta | B60L 15/10 701/22 |

\* cited by examiner

DRIVE UNIT AND DRIVE MODULE

INCORPORATION BY REFERENCE

The disclosures of Japanese Patent Applications No. 2014-081127 and No. 2014-208790 respectively filed on Apr. 10, 2014 and Oct. 10, 2014, each including the specification, drawings and abstract, are incorporated herein by reference in their entireties.

BACKGROUND OF THE INVENTION

1. Field of the Invention

The present invention relates to a drive unit and a drive module.

2. Description of the Related Art

Japanese Patent Application Publication No. 9-322311 (JP 9-322311 A), for example, describes a vehicle control device according to the related art that is provided in a vehicle to control rotation of a motor that generates a drive force on a drive shaft that transmits torque to drive wheels. In the vehicle control device, motors such as a clutch motor and an assist motor are controlled to control torque to be transferred to the drive wheels.

In a vehicle control device such as that according to JP 9-322311 A, a target value is derived so that torque that corresponds to the amount by which a driver depresses an accelerator pedal is output as described in relation to control during rearward travel of a vehicle. A torque command value is set in accordance with the derived target value so as to cause the clutch motor and the assist motor to output torque.

In some cases, torque transferred from each motor to the drive wheels passes through a drive unit that includes a speed reducer. The drive unit includes a plurality of gears rotatably supported by a plurality of bearings, and a load acts on the bearings because of rotation of the gears when the vehicle travels forward or rearward.

If the vehicle control device according to JP 9-322311 A is applied to the drive unit, the difference between the magnitude of a load that acts on the bearings during forward travel of the vehicle and the magnitude of such a load during rearward travel of the vehicle is not taken into consideration in deriving the target value. Thus, bearings that can support the maximum load are selected irrespective of whether the vehicle is traveling forward or rearward. Therefore, large bearings are selected irrespective of the load that actually acts on the bearings, which is disadvantageous in terms of reducing the size of the drive unit.

SUMMARY OF THE INVENTION

It is an object of the present invention to provide a drive unit and a drive module with a reduced size.

According to a first aspect of the present invention, a drive unit includes:
  a speed reducer, in which:
  the drive unit transfers rotation of a motor that serves as a drive source of a vehicle to drive wheels to transfer torque of the motor to the drive wheels;
  the speed reducer includes a plurality of gears having helical teeth and a plurality of bearings that rotatably support the gears;
  the speed reducer is configured such that a direction of an axial force that acts in an axial direction of the bearings from the gears when the vehicle travels forward is opposite to a direction of an axial force that acts in the axial direction of the bearings from the gears when the vehicle travels rearward;
  the speed reducer is configured such that a bearing of the plurality of bearings, the bearing receiving the axial force when the vehicle travels forward, and a bearing of the plurality of bearings, the bearing receiving the axial force when the vehicle travels rearward, are different from each other; and
  the speed reducer is configured such that the bearing that receives the axial force when the vehicle travels forward and the bearing that receives the axial force when the vehicle travels rearward are different in size from each other.

According to the configuration, the gears which constitute the speed reducer have helical teeth, and thus an axial force acts in a predetermined axial direction that corresponds to the rotational direction and the direction of the tooth traces of the gears through meshing between the gears. The rotational direction of the gears during forward travel of the vehicle and the rotational direction of the gears during rearward travel of the vehicle are opposite to each other. Thus, the direction in which an axial force acts during forward travel of the vehicle and the direction in which an axial force acts during rearward travel of the vehicle are also opposite to each other. The axial force acts as a load on one of the bearings that support the gear on the side on which the axial force acts. In addition, the magnitude of the axial force is varied in proportion to the magnitude of torque generated by the motor. If the maximum value of torque to be generated by the motor in the case where the vehicle travels forward and the maximum value of torque to be generated by the motor in the case where the vehicle travels rearward are set to be different from each other in accordance with the front-rear weight distribution of the vehicle weight acting on the front wheels and the vehicle weight acting on the rear wheels, the maximum values of the axial forces corresponding to the maximum values of the torques are also different from each other. It is only necessary that a bearing that supports an axial force should have a load capacity that matches the magnitude of the axial force, and a smaller bearing that has a smaller load capacity may be used as a bearing that supports a smaller axial force. Thus, the size of the drive unit can be reduced.

According to a second aspect of the present invention, a drive module includes:
  the drive unit according to the first aspect; and
  a vehicle control device that controls torque to be generated by the motor.

The vehicle control device may be programmed to set the maximum value of torque to be generated by the motor during forward travel so as to be larger than that during rearward travel in the case where a front-rear weight distribution of the vehicle is determined such that a weight on a front side of the vehicle is larger than a weight on a rear side of the vehicle, and to set the maximum value of torque to be generated by the motor during rearward travel so as to be larger than that during forward travel in the case where the front-rear weight distribution of the vehicle is determined such that the weight on the rear side of the vehicle is larger than the weight on front side of the vehicle; and
  the speed reducer may be configured such that a size of a bearing of the plurality of bearings, the bearing receiving an axial force from a gear of the plurality of gears when the vehicle travels in a direction for which the maximum value of torque to be generated by the motor is set to be larger, is larger than a size of a bearing of the plurality of bearings, the bearing receiving an axial force from a gear when the vehicle travels in a direction for which the maximum value of torque to be generated by the motor is set to be smaller.

When the vehicle is driven to the side with a larger front-rear weight distribution, large torque is required particularly at the start of travel of the vehicle compared to drive to the side with a small front-rear weight distribution. Therefore, it is desirable that the maximum value of torque to be generated by the motor should be large during drive to the side with a large front-rear weight distribution. It is only necessary that a bearing that receives an axial force should have a load capacity that matches the magnitude of the axial force, and a smaller bearing that has a smaller load capacity may be used as a bearing that receives a smaller axial force. Thus, the size of the drive module can be reduced.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A drive unit and a drive module according to a first embodiment will be described below.

Figure 1:
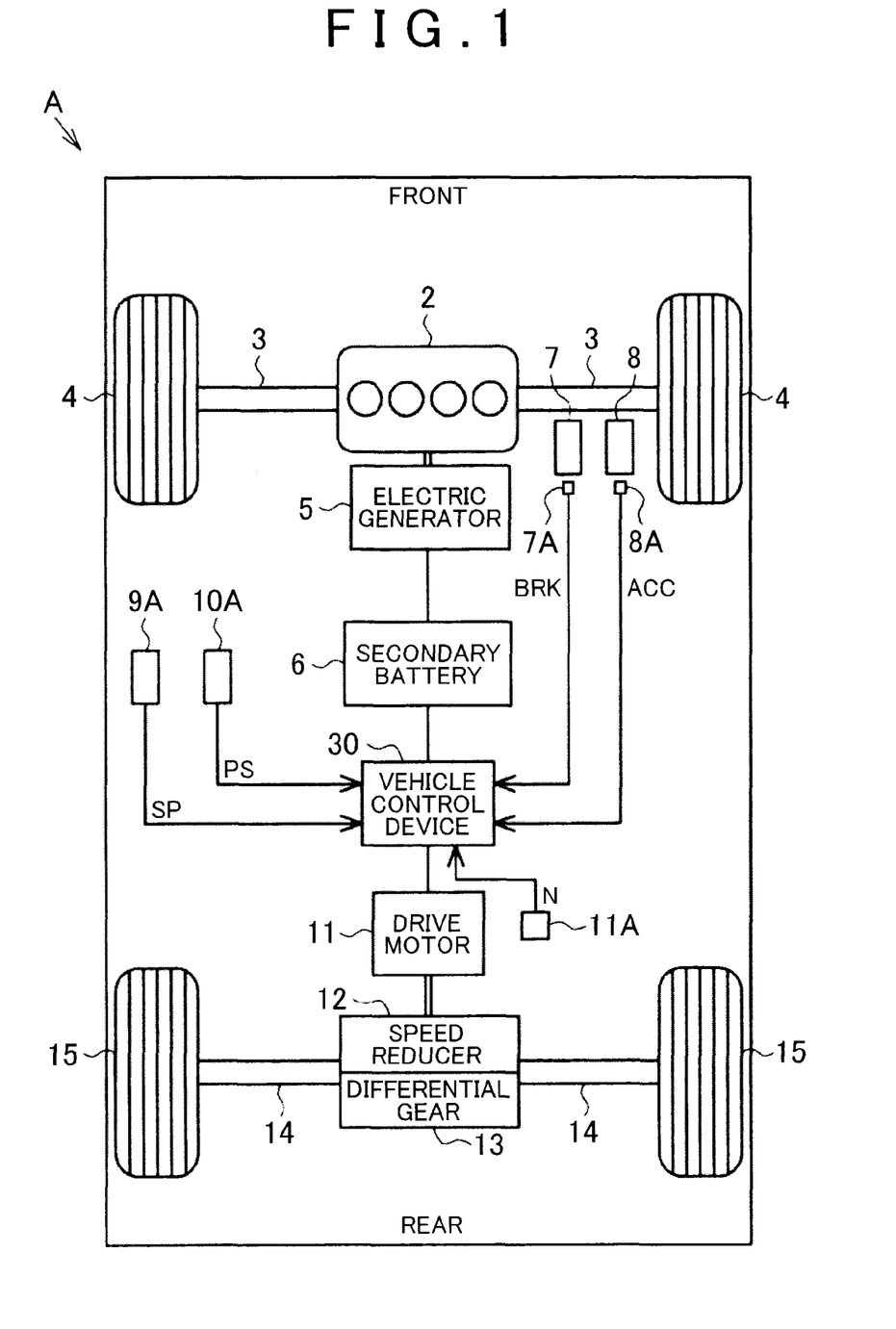
FIG. 1 illustrates an overview of a vehicle according to a first embodiment.

As illustrated in FIG. 1, a vehicle A includes an internal combustion engine 2 that serves as a main drive source. Drive shafts 3 that transfer power of the internal combustion engine 2 are mechanically coupled to the internal combustion engine 2. A pair of right and left front drive wheels 4 provided on the front side of the vehicle is coupled to the internal combustion engine 2 via the drive shafts 3.

An electric generator (in the embodiment, a three-phase brushless motor) 5 that rotates using power of the internal combustion engine 2 to generate electricity is mechanically coupled to the internal combustion engine 2. A secondary battery 6 that is constituted of a lithium-ion battery, for example, is electrically connected to the electric generator 5 as a power source to be charged with electricity generated by the electric generator 5. A vehicle control device 30 that operates using electricity from the secondary battery 6 is electrically connected to the secondary battery 6. A drive motor (in the embodiment, a three-phase brushless motor) 11 that serves as an auxiliary drive source for the vehicle A is also electrically connected to the secondary battery 6 via the vehicle control device 30.

Various sensors that detect the travel state of the vehicle A or the like including a brake sensor 7A, an accelerator sensor 8A, a vehicle speed sensor 9A, a position sensor 10A, and a rotational speed sensor 11A are electrically connected to the vehicle control device 30. The brake sensor 7A is a sensor that detects a brake operation amount BRK of a brake pedal 7. The accelerator sensor 8A is a sensor that detects an accelerator operation amount ACC of an accelerator pedal 8. The vehicle speed sensor 9A is a sensor that detects a vehicle speed SP of the vehicle A. The position sensor 10A is a sensor that detects a shift position PS of an automatic transmission of the vehicle A. The detected shift position may be whether the shift position of the automatic transmission is a forward travel position or a rearward travel position, for example. The rotational speed sensor 11A is a sensor that detects the rotational speed of the drive motor 11, that is, a motor rotational speed N.

Figure 2:
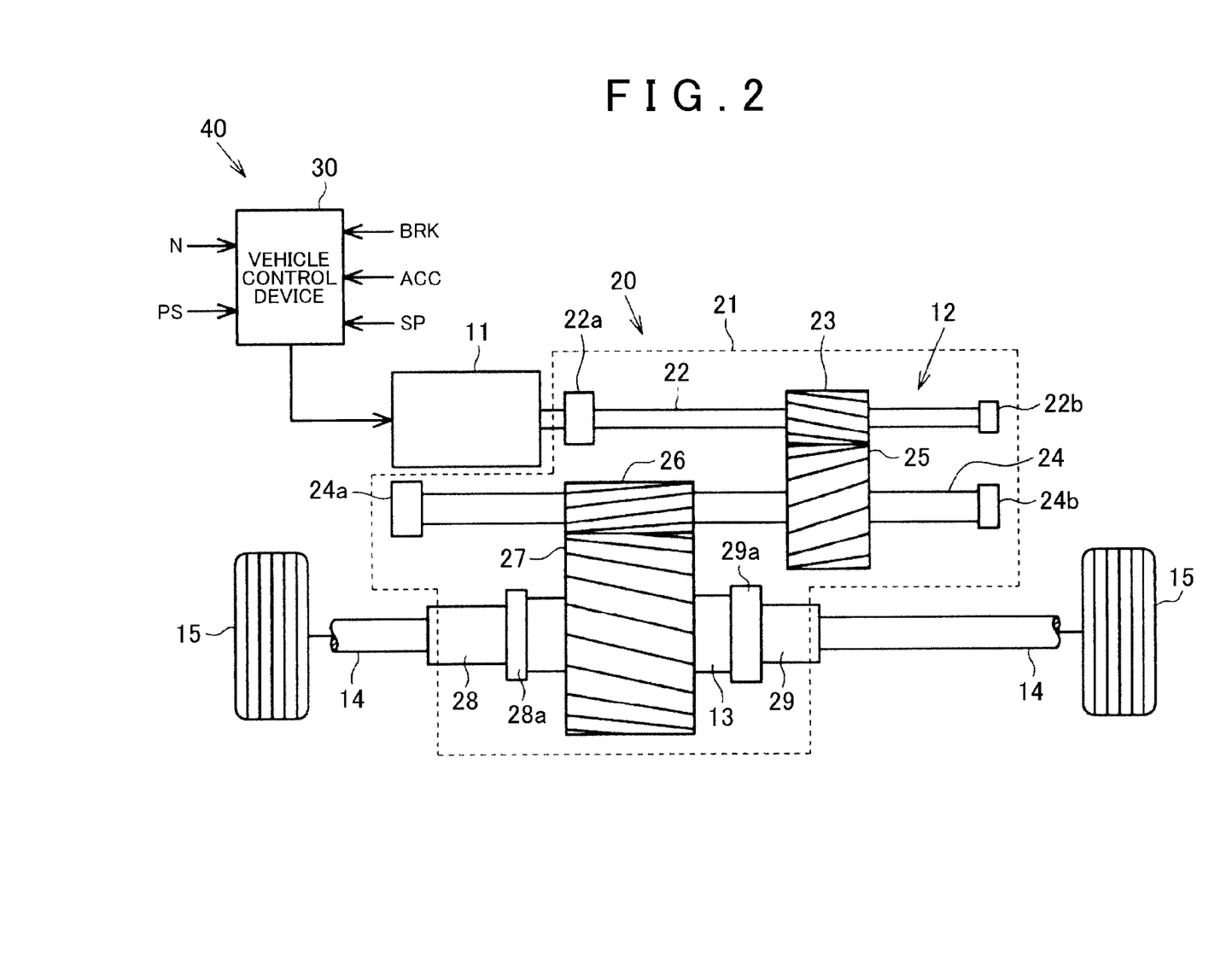
FIG. 2 illustrates an overview of a drive unit.

As illustrated in FIG. 2, the vehicle control device 30 grasps the travel state of the vehicle A on the basis of detection signals from the sensors, and controls various in-vehicle devices in accordance with the grasped travel state. In the embodiment, drive of the drive motor 11, which is an example of such in-vehicle devices, is controlled.

A speed reducer 12 and a differential gear 13 that adjust and transfer power of the drive motor 11 to drive shafts 14 are coupled to the drive motor 11. A pair of right and left rear drive wheels 15 provided on the rear side of the vehicle is coupled to the drive motor 11 via the speed reducer 12, the differential gear 13, and the drive shafts 14.

The vehicle A according to the embodiment is a so-called front-engine front-drive (FF) vehicle in which power of the internal combustion engine 2 mounted on the front side of the vehicle A is provided to the front drive wheels 4 to generate a drive force of the vehicle A. The vehicle A is a so-called hybrid four-wheel drive vehicle in which the electric generator 5 generates electricity using power of the internal combustion engine 2 to charge the secondary battery 6 and electricity is supplied from the secondary battery 6 to the drive motor 11 which drives the rear drive wheels 15 to generate a drive force of the vehicle A.

The drive force generated by the drive motor 11 is transferred to the rear drive wheels 15 by way of the drive shafts 14.

The configuration of the drive motor 11, the speed reducer 12, the differential gear 13, and the drive shafts 14 will be described.

As illustrated in FIG. 2, the speed reducer 12 and the differential gear 13 are housed in a housing 21 to constitute a drive unit 20 that transfers power from the drive motor 11 to the drive shafts 14 and the rear drive wheels 15.

The drive unit 20 includes an input shaft 22 mechanically coupled to the drive motor 11 to transfer power of the drive motor 11 to the speed reducer 12. The input shaft 22 is rotatably supported by a first input bearing 22a and a second input bearing 22b fixed to the housing 21. The second input bearing 22b is smaller in size than the first input bearing 22a, and has a smaller load capacity than that of the first input bearing 22a. An input gear 23 having helical teeth (see FIG. 2; with tooth traces depicted as sloping downward to the right) is coupled to the input shaft 22 so as to rotate together with the input shaft 22.

A large-diameter intermediate gear 25 is meshed with the input gear 23. The large-diameter intermediate gear 25 is coupled so as to rotate together with an intermediate shaft 24, has helical teeth (see FIG. 2; with tooth traces depicted as sloping downward to the left), and is larger in diameter than the input gear 23. The intermediate shaft 24 is rotatably supported by a first intermediate bearing 24a and a second intermediate bearing 24b fixed to the housing 21. The second intermediate bearing 24b is smaller in size than the first intermediate bearing 24a, and has a smaller load capacity than that of the first intermediate bearing 24a. A small-diameter intermediate gear 26 is coupled to a portion of the intermediate shaft 24 between the large-diameter intermediate gear 25 and the first intermediate bearing 24a so as to rotate together with the intermediate shaft 24. The small-diameter intermediate gear 26 has helical teeth (see FIG. 2; with tooth traces depicted as sloping downward to the left), is smaller in diameter than the large-diameter intermediate gear 25, and has a large length in the axial direction.

An output gear 27 is meshed with the small-diameter intermediate gear 26. The output gear 27 is mechanically coupled so as to transfer power transferred from the drive motor 11 to the differential gear 13, has helical teeth (see FIG. 2; with tooth traces depicted as sloping downward to the right), and is larger in diameter than the small-diameter intermediate gear 26. The differential gear 13 includes a first output shaft 28 and a second output shaft 29 that are rotatable along with rotation of the output gear 27. The differential gear 13 transfers power transferred from the drive motor 11 to the first output shaft 28 and the second output shaft 29 while allowing relative rotation between the first output shaft 28 and the second output shaft 29. The differential gear 13 is rotatably supported by a first output bearing 28a and a second output bearing 29a fixed to the housing 21. The second output bearing 29a is larger in size than the first output bearing 28a, and has a larger load capacity than that of the first output bearing 28a.

The drive shafts 14 are mechanically coupled to the first output shaft 28 and the second output shaft 29. The drive shafts 14 transfer a force transferred from the drive motor 11 via the speed reducer 12 and the differential gear 13 to the rear drive wheels 15. In the embodiment, the input shaft 22, the input gear 23, the intermediate shaft 24, the large-diameter intermediate gear 25, the small-diameter intermediate gear 26, and the output gear 27, which are disposed in the path through which power of the drive motor 11 is transferred to the differential gear 13, constitute the speed reducer 12. In the embodiment, the drive motor 11, the drive unit 20, and the vehicle control device 30, which generate power and transfer the power to the rear drive wheels 15, constitute a drive module 40.

Figure 3:
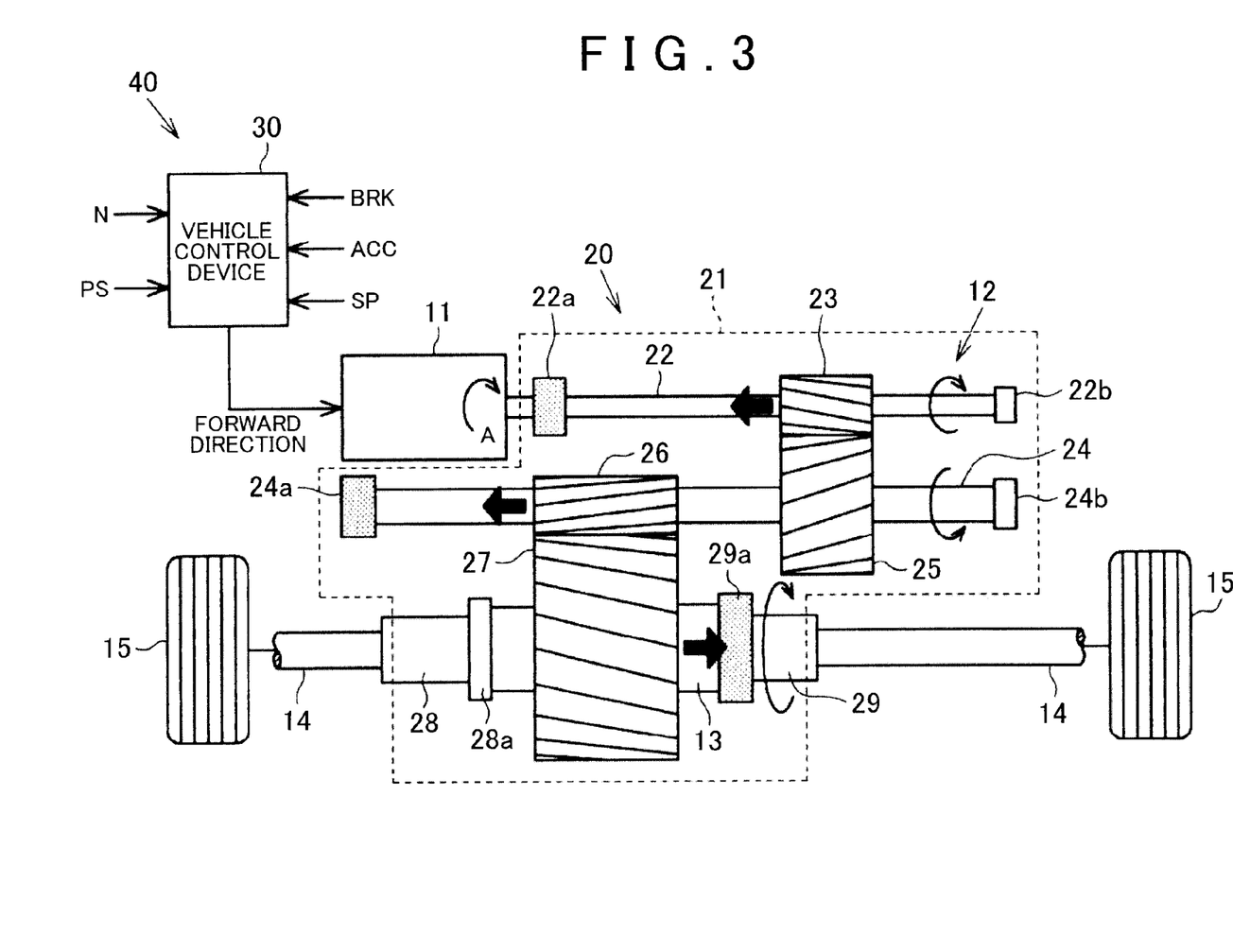
FIG. 3 illustrates operation of the drive unit during forward travel of the vehicle.

In the drive module 40, as illustrated in FIG. 3, when the vehicle control device 30 provides a command to drive the vehicle A forward and the drive motor 11 rotates in the A direction (forward direction), the input shaft 22 and the input gear 23 are rotated in the same direction. The large-diameter intermediate gear 25 is rotated in the direction opposite to the A direction through meshing with the input gear 23. The intermediate shaft 24 and the small-diameter intermediate gear 26 are rotated together in the direction opposite to the A direction through rotation of the large-diameter intermediate gear 25. The output gear 27 is rotated in the A direction through meshing with the small-diameter intermediate gear 26. The first output shaft 28 and the second output shaft 29 are relatively rotated in the A direction via the differential gear 13 through rotation of the output gear 27.

A reaction force received by the input gear 23 from the large-diameter intermediate gear 25 through the rotation described above acts in the direction from the input gear 23 toward the first input bearing 22a as a force in the axial direction of the input shaft 22. The first input bearing 22a and the second input bearing 22b which support the input shaft 22 are constituted as a combination of a thrust bearing that receives an axial force and a radial bearing that receives a force in a direction that is orthogonal to the axial direction. The first input bearing 22a which is large is configured to receive a thrust force only in the direction from the input gear 23 toward the first input bearing 22a and a radial force. The second input bearing 22b which is small is configured to receive a thrust force only in the direction from the input gear 23 toward the second input bearing 22b and a radial force. Thus, a force in the axial direction of the input shaft 22 produced by the reaction force received by the input gear 23 from the large-diameter intermediate gear 25 through the rotation described above acts only on the first input bearing 22a which is large.

A force received by the large-diameter intermediate gear 25 from the input gear 23 through the rotation described above acts in the direction from the large-diameter intermediate gear 25 toward the second intermediate bearing 24b as a force in the axial direction of the intermediate shaft 24. On the other hand, a reaction force received by the small-diameter intermediate gear 26 from the output gear 27 through the rotation described above acts in the direction from the large-diameter intermediate gear 25 toward the first intermediate bearing 24a as a force in the axial direction of the intermediate shaft 24. In the embodiment, the large-diameter intermediate gear 25 is larger in diameter than the small-diameter intermediate gear 26. Thus, the reaction force transmitted from the output gear 27 to the small-diameter intermediate gear 26 is larger than the force transmitted from the input gear 23 to the large-diameter intermediate gear 25, and the difference between such forces acts in the direction from the small-diameter intermediate gear 26 toward the first intermediate bearing 24a as a force in the axial direction of the intermediate shaft 24. As with the first input bearing 22a and the second input bearing 22b which support the input shaft 22, the first intermediate bearing 24a and the second intermediate bearing 24b which support the intermediate shaft 24 are constituted as a combination of a thrust bearing that receives an axial force and a radial bearing that receives a force in a direction that is orthogonal to the axial direction. The bearings can receive a thrust force only in specific directions as determined for the bearings for the input shaft 22. Thus, an axial force in the direction from the small-diameter intermediate gear 26 toward the first intermediate bearing 24a acts only on the first intermediate bearing 24a which is large.

A force transmitted from the small-diameter intermediate gear 26 to the output gear 27 through the rotation described above acts in the direction from the output gear 27 toward the second output bearing 29a as a force in the axial direction of the differential gear 13. As with the first input bearing 22a and the second input bearing 22b which support the input shaft 22, the first output bearing 28a and the second output bearing 28b which support the differential gear 13 are constituted as a combination of a thrust bearing that receives an axial force and a radial bearing that receives a force in a direction that is orthogonal to the axial direction to provide similar functions. Thus, an axial force in the direction from the output gear 27 toward the second output bearing 29a acts only on the second output bearing 29a which is large.

As understood from the above description, bearings that are larger than the others of the paired bearings such as the first input bearing 22a, the first intermediate bearing 24a, and the second output bearing 29a receive a force in the axial direction when the vehicle travels forward.

Figure 4:
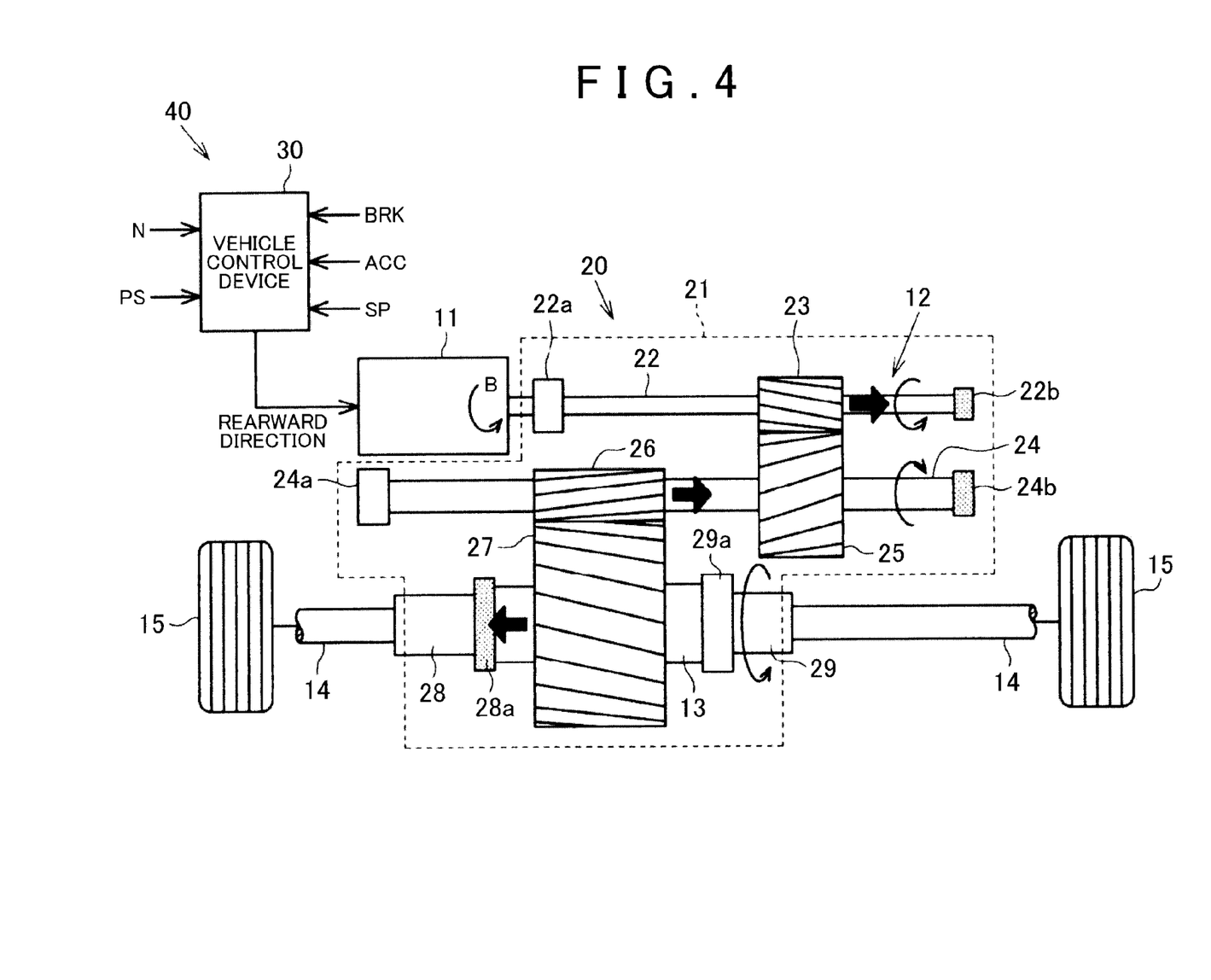
FIG. 4 illustrates operation of the drive unit during rearward travel of the vehicle.

In the drive module 40, as illustrated in FIG. 4, when the vehicle control device 30 provides a command to drive the vehicle A rearward and the drive motor 11 rotates in the B direction (rearward direction), the input shaft 22 and the input gear 23 are rotated in the same direction. The large-diameter intermediate gear 25 is rotated in the direction opposite to the B direction through meshing with the input gear 23. The intermediate shaft 24 and the small-diameter intermediate gear 26 are rotated together in the direction opposite to the B direction through rotation of the large-diameter intermediate gear 25. The output gear 27 is rotated in the B direction through meshing with the small-diameter intermediate gear 26. The first output shaft 28 and the second output shaft 29 are relatively rotated in the B direction via the differential gear 13 through rotation of the output gear 27.

A reaction force received by the input gear 23 from the large-diameter intermediate gear 25 through the rotation described above acts in the direction from the input gear 23 toward the second input bearing 22b as a force in the axial direction of the input shaft 22. The first input bearing 22a and the second input bearing 22b which support the input shaft 22 are constituted as a combination of a thrust bearing that receives an axial force and a radial bearing that receives a force in a direction that is orthogonal to the axial direction. The first input bearing 22a which is large is configured to receive a thrust force only in the direction from the input gear 23 toward the first input bearing 22a and a radial force. The second input bearing 22b which is small is configured to receive a thrust force only in the direction from the input gear 23 toward the second input bearing 22b and a radial force. Thus, a force in the axial direction of the input shaft 22 produced by the reaction force received by the input gear 23 from the large-diameter intermediate gear 25 through the rotation described above acts only on the second input bearing 22b which is small.

A force received by the large-diameter intermediate gear 25 from the input gear 23 through the rotation described above acts in the direction from the large-diameter intermediate gear 25 toward the first intermediate bearing 24a as a force in the axial direction of the intermediate shaft 24. On the other hand, a reaction force received by the small-diameter intermediate gear 26 from the output gear 27 through the rotation described above acts in the direction from the large-diameter intermediate gear 25 toward the second intermediate bearing 24b as a force in the axial direction of the intermediate shaft 24. In the embodiment, the large-diameter intermediate gear 25 is larger in diameter than the small-diameter intermediate gear 26. Thus, the reaction force transmitted from the output gear 27 to the small-diameter intermediate gear 26 is larger than the force transmitted from the input gear 23 to the large-diameter intermediate gear 25, and the difference between such forces acts in the direction from the small-diameter intermediate gear 26 toward the second intermediate bearing 24b as a force in the axial direction of the intermediate shaft 24. As with the first input bearing 22a and the second input bearing 22b which support the input shaft 22, the first intermediate bearing 24a and the second intermediate bearing 24b which support the intermediate shaft 24 are constituted as a combination of a thrust bearing that receives an axial force and a radial bearing that receives a force in a direction that is orthogonal to the axial direction. The bearings can receive a thrust force only in specific directions as determined for the bearings for the input shaft 22. Thus, an axial force in the direction from the small-diameter intermediate gear 26 toward the second intermediate bearing 24b acts only on the second intermediate bearing 24b which is small.

A force transmitted from the small-diameter intermediate gear 26 to the output gear 27 through the rotation described above acts in the direction from the output gear 27 toward the first output bearing 28a as a force in the axial direction of the differential gear 13. As with the first input bearing 22a and the second input bearing 22b which support the input shaft 22, the first output bearing 28a and the second output bearing 28b which support the differential gear 13 are constituted as a combination of a thrust bearing that receives an axial force and a radial bearing that receives a force in a direction that is orthogonal to the axial direction to provide similar functions. Thus, an axial force in the direction from the output gear 27 toward the first output bearing 28a acts only on the first output bearing 28a which is small.

That is, bearings that are smaller than the others of the paired bearings such as the second input bearing 22b, the second intermediate bearing 24b, and the first output bearing 28a receive a force in the axial direction when the vehicle travels rearward.

A process for the vehicle control device 30 to control drive of the drive motor 11 will be described.

In the case where a command value is generated to rotate the drive motor 11 in order to drive the vehicle A forward or rearward, the vehicle control device 30 commands torque to be generated by the drive motor 11 as a torque command value T*.

A torque restriction value is defined that falls within the range of torque that can be generated by the drive motor 11 in accordance with the specifications of the drive motor 11. The maximum value of the torque command value T* is restricted by the torque restriction value. The upper limit of torque generated by the drive motor 11 is restricted by the torque restriction value defined in advance. The torque command value T* is calculated using a map (not illustrated) in accordance with the various detection signals such as the brake operation amount BRK, the accelerator operation amount ACC, the vehicle speed SP, and the motor rotational speed N.

The torque command value T* which commands torque (forward travel torque T(+) [N]) for forward drive (forward rotation (+side) of the drive motor 11) and torque (rearward travel torque T(−) [N]) for rearward drive (rearward rotation (−side) of the drive motor 11) is computed in accordance with the shift position PS. In the embodiment, the torque command value T* is calculated as the absolute value of torque to be generated by the drive motor 11 using an identical map during both forward travel and rearward travel. The torque command value T* is set to the same value as the torque restriction value in a motor rotational speed range in which the motor rotational speed N [rpm] is from zero to a threshold $\alpha$. The torque command value T* is set so as to become smaller as the motor rotational speed N becomes higher in a motor rotational speed range in which the motor rotational speed N [rpm] is more than the threshold $\alpha$.

When the vehicle is driven forward on the basis of the shift position PS, the vehicle control device 30 performs a driving process in which the torque command value T* is computed using the map described above from the various detection signals and rotation (forward rotation) of the drive motor 11 is controlled in accordance with the torque command value T*. The vehicle control device 30 sets the map described above with the torque restriction value for the drive motor 11 during forward travel set to T(+)max, and stores the map in the storage unit.

Figure 5:
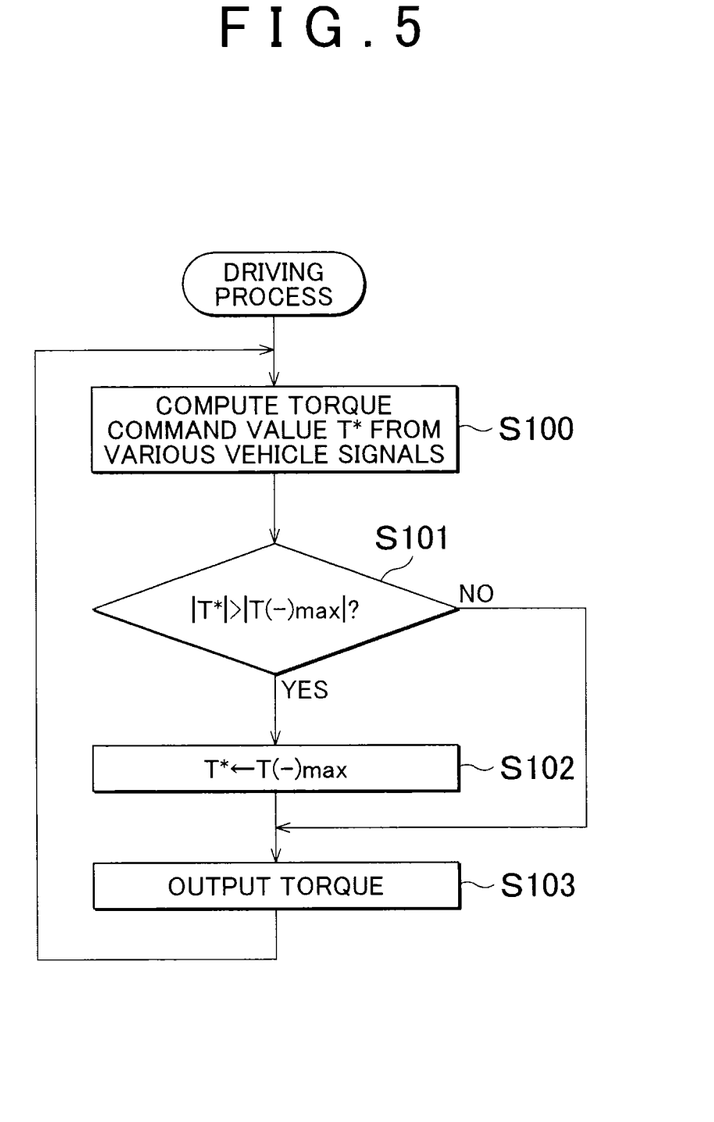
FIG. 5 is a flowchart illustrating a driving process.

FIG. 5 illustrates a driving process performed when the vehicle control device 30 drives the vehicle rearward on the basis of the shift position PS.

The vehicle control device 30 executes a derivation process in which a torque command value T* is computed using the map described above from the various detection signals (step S100). Subsequently, the vehicle control device 30 determines whether or not the absolute value of the torque command value T* computed in step S100 is more than the absolute value of T(−)max(|T*|>|T(−)max|) (step S101). T(−)max is the upper limit of torque that is allowed to be generated by the drive motor 11 during rearward travel, namely the torque restriction value during rearward travel. In the vehicle according to the embodiment, the center of gravity is leaned to the front wheel side, and the vehicle weight acting on the front wheels is larger than the vehicle weight acting on the rear wheels. The response of the vehicle is improved if the drive motor 11 generates large torque during forward travel in which the vehicle travels to the side where a large weight acts on the wheels, namely to the front wheel side. Therefore, it is desirable that the torque restriction value T(+)max during forward travel, which is the upper-limit value of torque that is allowed to be generated by the drive motor 11 during forward travel, should be larger than the torque restriction value T(−)max during rearward travel, and the torque restriction value is set in such a manner in the map according to the embodiment described above.

If it is determined in step S101 that the absolute value of the torque command value T* is larger (larger on the negative (−) side) than the absolute value of T(−)max (step S101: YES), the vehicle control device 30 executes a setting process in which T(−)max is set in place of the value computed in step S100 as the torque command value T* (step S102). After that, the vehicle control device 30 controls rotation (reverse rotation) of the drive motor 11 so as to output torque at the torque command value T* set in step S102 (step S103).

If it is determined in step S101 that the torque command value T* is not larger than T(−)max (step S101: NO), on the other hand, the vehicle control device 30 controls rotation (reverse rotation) of the drive motor 11 so as to output torque at the value computed in step S100 as it is as the torque command value T* (step S103).

According to the drive unit 20 and the drive module 40 described above, the following functions and advantageous effects are obtained.

(1) In the speed reducer 12, a force in the axial direction acts that corresponds to the rotational direction and the direction of the tooth traces of the gears 23, 25, 26, and 27 through meshing between the gears. The force in the axial direction is applied as a load to one of the bearings that support the gear on the side on which the force in the axial direction acts. The direction in which the force in the axial direction acts is varied to the opposite direction if rotation of the gear is reversed. The magnitude of the force in the axial direction is varied in proportion to the magnitude of torque generated by the drive motor 11.

In the embodiment, the torque restriction value for rearward travel is set to be smaller than the torque restriction value for forward travel (|T(−)max|<|T(+)max|).

Figure 6:
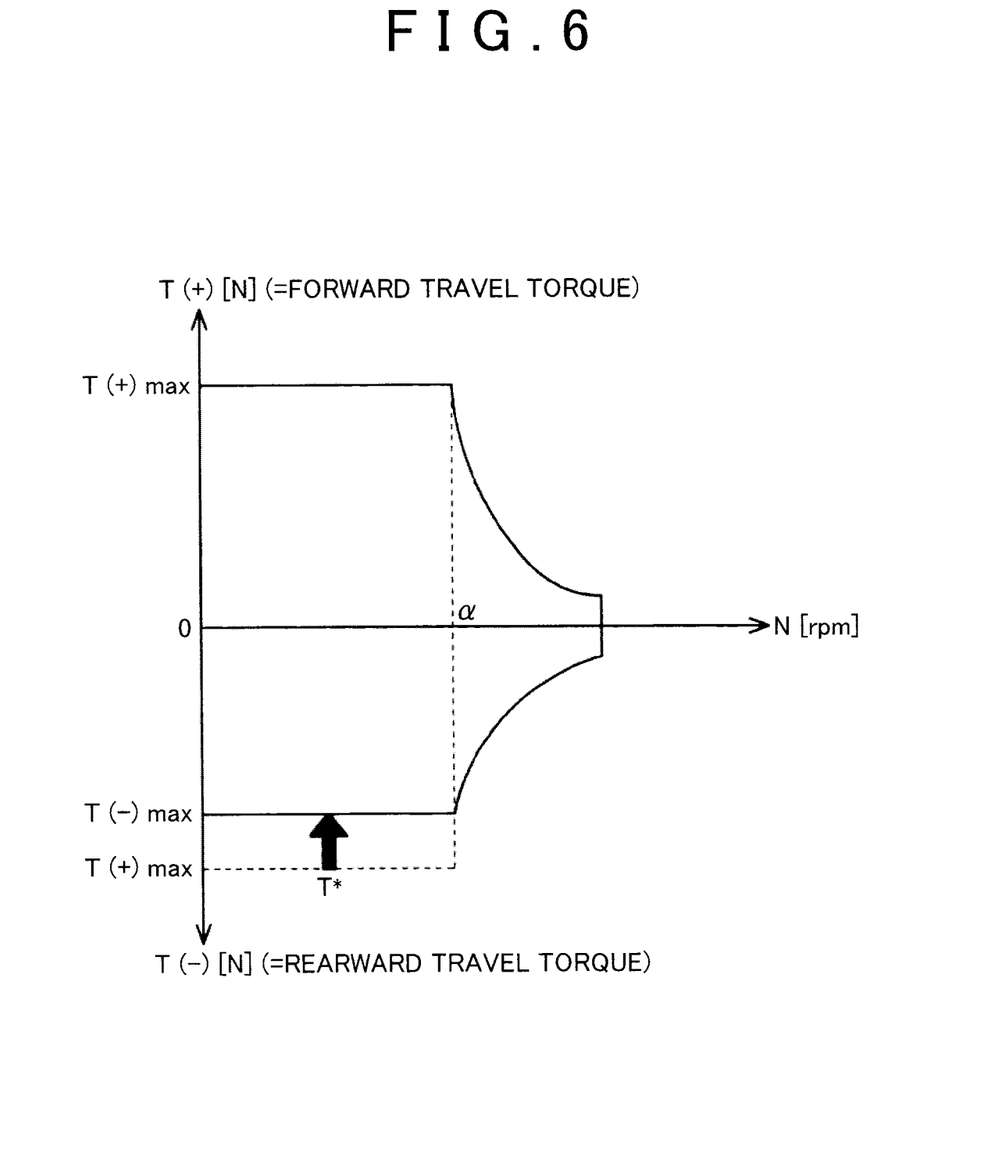
FIG. 6 illustrates torque restriction values for forward travel torque and rearward travel torque.

With reference to FIG. 6, in the case where torque to be generated during forward travel is defined as forward travel torque T(+), the forward travel torque T(+) is at T(+)max in the motor rotational speed range in which the motor rotational speed N is up to the threshold α. The forward travel torque T(+) becomes gradually smaller as the motor rotational speed N becomes more than the threshold α. The torque restriction value for the forward travel torque T(+) is T(+)max.

In the case where torque to be generated during rearward travel is defined as rearward travel torque T(−), the rearward travel torque T(−) is at T(−)max in the motor rotational speed range in which the motor rotational speed N is up to the threshold α. In the motor rotational speed range, if a value that is more than T(−)max is commanded as the torque command value T*, the value is forcibly reduced to T(−)max. The rearward travel torque T(−) becomes gradually smaller as the motor rotational speed N becomes more than the threshold α. The torque restriction value T(−)max during rearward travel is smaller than the torque restriction value T(+)max during forward travel.

The torque restriction value T(−)max during rearward travel is smaller than the torque restriction value T(+)max during forward travel. Therefore, the maximum value of torque to be generated during rearward travel is smaller than the maximum value of torque to be generated during forward travel. Thus, the maximum value of the force in the axial direction that acts through meshing between the gears is also smaller, which enables a reduction in size of the bearings that support the force. Thus, the size of the drive unit 20 can be reduced.

(2) Depending on the specifications of the drive system of the vehicle, the magnitude of torque to be generated during forward travel of the vehicle may not necessarily be the same as that during rearward travel of the vehicle in some cases, and the maximum value of torque that is allowed to be generated during forward travel and that during rearward travel may be set as different values in some cases.

Specifically, when the vehicle moves to the smaller front-rear weight distribution side, travel of the vehicle is not obstructed even if drive torque is small at the start of travel of the vehicle compared to movement to the larger front-rear weight distribution side. That is, in the vehicle A according to the embodiment which is an FF vehicle, the front-rear weight distribution of the vehicle A is determined such that the weight on the rear side of the vehicle is smaller, and the maximum value of torque to be generated during rearward travel can be made smaller than that during forward travel.

Under the above precondition, the load applied to the bearings such as the second input bearing 22*b*, the second intermediate bearing 24*b*, and the first output bearing 28*a*, on which a force in the axial direction acts through meshing between the gears, is smaller than that acting on the others of the paired bearings. Thus, bearings that are smaller in size than the others can be used as the bearings mentioned above. Thus, the size of the drive unit 20 can be reduced. Adopting the drive unit 20 that can be reduced in size can reduce the size of the drive module 40.

The embodiment described above may be modified as appropriate to be implemented in the following forms.

It is only necessary that a bearing that supports at least one of the input shaft 22, the intermediate shaft 24, and the output shafts 28 and 29 should be reduced in size.

The gears of the speed reducer 12 may include gears having helical teeth and gears having spur teeth in combination. In such a case as well, the load applied to the bearings during drive to the side for which a small torque restriction value is set can be reduced for the embodiment described above.

The function of the speed reducer 12 to adjust power of the drive motor 11 may be implemented as adjustment in one step with the intermediate shaft 24 omitted, or may be implemented as adjustment in three steps with the input shaft 22, the intermediate shaft 24, and an additional second intermediate shaft.

An angular bearing may be used in place of a thrust bearing as a bearing that receives a thrust force. In this case, in order for the bearing to receive a thrust force only in one direction, the bearing may be assembled with a preload applied so as to be displaced by a certain amount in the thrust direction.

A drive force for the front drive wheels 4 or the rear drive wheels 15 which are not directly coupled to the internal combustion engine 2 may be generated by in-wheel motors in place of the drive motor 11.

The vehicle may he a hybrid vehicle with a different drive system, or a so-called electric vehicle. Besides, the vehicle may be a fuel-cell vehicle that uses a fuel cell as a power source.

In the embodiment, the vehicle is a four-wheel drive vehicle based on the FF system with a large vehicle weight distribution to the front side. However, the present invention may also be applied to a four-wheel drive vehicle based on a rear-engine rear-drive (RR) system with a large vehicle weight distribution to the rear side, for example.

What is claimed is:

1. A drive unit that transfers rotation of a motor that serves as a drive source of a vehicle to drive wheels to transfer torque of the motor to the drive wheels, comprising:
   a speed reducer including a plurality of gears having helical teeth and a plurality of bearings that rotatably support the gears, wherein
   the speed reducer is configured such that a direction of an axial force that acts in an axial direction of the bearings from the gears when the vehicle travels forward is opposite to a direction of an axial force that acts in the axial direction of the bearings from the gears when the vehicle travels rearward, wherein
   the speed reducer is configured such that a first bearing of the plurality of bearings receives the axial force when the vehicle travels forward, and a second bearing of the plurality of bearings receives the axial force when the vehicle travels rearward, wherein
   the speed reducer is configured such that the first bearing that receives the axial force when the vehicle travels forward and the second bearing that receives the axial force when the vehicle travels rearward are different in size from each other.

2. A drive module comprising:
   a drive unit that transfers rotation of a motor that serves as a drive source of a vehicle to drive wheels to transfer torque of the motor to the drive wheels, comprising a speed reducer including a plurality of gears having helical teeth and a plurality of bearings that rotatably support the gears, wherein the speed reducer is configured such that a direction of an axial force that acts in an axial direction of the bearings from the gears when the vehicle travels forward is opposite to a direction of an axial force that acts in the axial direction of the bearings from the gears when the vehicle travels rearward, wherein the speed reducer is configured such that a first bearing of the plurality of bearings receives the axial force when the vehicle travels forward, and a second bearing of the plurality of bearings receives the axial force when the vehicle travels rearward, wherein the speed reducer is configured such that the first bearing that receives the axial force when the vehicle travels forward and the second bearing that receives the axial force when the vehicle travels rearward are different in size from each other; and
   a vehicle control device that controls torque to be generated by the motor, wherein
   the vehicle control device sets a maximum value of torque to be generated by the motor during forward travel of the vehicle and a maximum value of torque to be generated by the motor during rearward travel of the vehicle to different values.

3. The drive module according to claim 2, wherein
   the vehicle control device is programmed to set the maximum value of torque to be generated by the motor during forward travel so as to be larger than that during rearward travel in the case where a front-rear weight distribution of the vehicle is determined such that a weight on a front side of the vehicle is larger than a weight on a rear side of the vehicle, and to set the maximum value of torque to be generated by the motor during rearward travel so as to be larger than that during forward travel in the case where the front-rear weight distribution of the vehicle is determined such that the weight on the rear side of the vehicle is larger than the weight on the front side of the vehicle; and
   the speed reducer is configured such that the first bearing of the plurality of bearings or the second bearing of the plurality of bearings corresponding to the larger maximum value of torque to be generated by the motor is larger in size than the size of the other bearing of the first bearing of the plurality of bearings or the second bearing of the plurality of bearings.

\* \* \* \* \*